United States Patent
Garcia et al.

(10) Patent No.: US 6,698,415 B2
(45) Date of Patent: Mar. 2, 2004

(54) METHOD FOR CUTTING AND MACHINING HARD MATERIALS

(75) Inventors: Michael J. Garcia, Columbia, SC (US); Denis G. Pearce, Ringwood, NJ (US)

(73) Assignees: Smith International, Inc., Houston, TX (US); Sandvik AB, Sandviken (SE)

( * ) Notice: Subject to any disclaimer, the term of this patent is extended or adjusted under 35 U.S.C. 154(b) by 113 days.

(21) Appl. No.: 09/799,903

(22) Filed: Mar. 6, 2001

(65) Prior Publication Data

US 2002/0014232 A1 Feb. 7, 2002

Related U.S. Application Data

(63) Continuation of application No. 09/414,028, filed on Oct. 1, 1999.
(60) Provisional application No. 60/102,880, filed on Oct. 2, 1998.

(51) Int. Cl.⁷ .................................................. B28D 1/02
(52) U.S. Cl. ........................................ 125/12; 125/13.01
(58) Field of Search ......................... 125/12, 14, 12.01, 125/13.01, 22, 20

(56) References Cited

U.S. PATENT DOCUMENTS

| | | | |
|---|---|---|---|
| 4,252,102 A | 2/1981 | Phaal et al. ................... 125/39 |
| 4,476,656 A | 10/1984 | Bovenkerk .................... 51/325 |
| 4,517,954 A | 5/1985 | deKok et al. ................. 125/15 |
| 4,702,649 A | * 10/1987 | Koanduri ..................... 51/293 |
| 4,714,385 A | 12/1987 | Komanduri ................. 407/119 |
| 4,848,205 A | 7/1989 | Suzuki et al. ................. 83/853 |
| 5,272,940 A | 12/1993 | Diskin ....................... 76/108.6 |
| 5,318,006 A | 6/1994 | Walen et al. ................. 125/36 |
| 5,381,780 A | * 1/1995 | Yelton et al. ................. 125/14 |
| 5,433,187 A | 7/1995 | Hayasaka et al. ............. 125/15 |
| 5,453,105 A | * 9/1995 | Middlemiss et al. .......... 51/307 |
| 5,580,196 A | 12/1996 | Thompson .................. 408/145 |
| 5,676,496 A | * 10/1997 | Littecke et al. ............. 407/118 |
| 5,794,503 A | 8/1998 | Asada ......................... 83/835 |
| 5,868,885 A | * 2/1999 | Crockett et al. .......... 156/89.27 |
| 6,298,762 B1 | * 10/2001 | LaRue et al. ................. 83/838 |

* cited by examiner

*Primary Examiner*—Lee D. Wilson
(74) *Attorney, Agent, or Firm*—Christie, Parker & Hale, LLP

(57) ABSTRACT

Cutting tools and machining tools are provided having PCBN tips and/or coatings bonded to their cutting or machining surfaces for cutting or machining cement and/or mineral based hard building materials such as Hardiplank®.

20 Claims, 1 Drawing Sheet

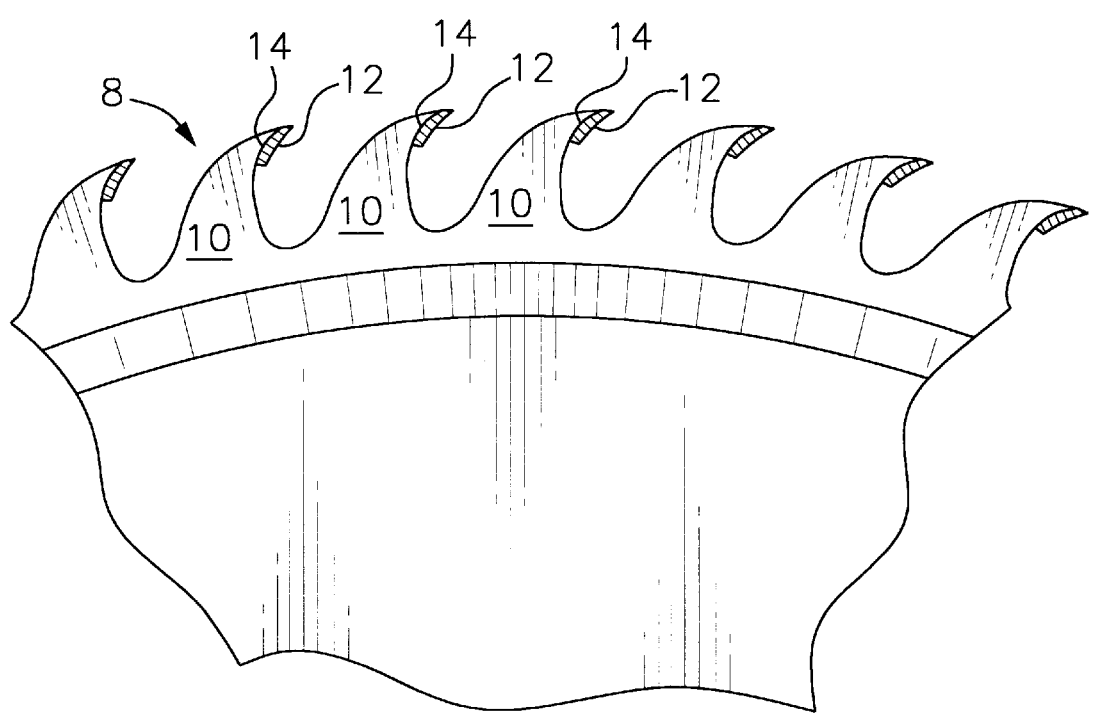

METHOD FOR CUTTING AND MACHINING HARD MATERIALS

CROSS REFERENCE TO RELATED APPLICATION

This application is a continuation of U.S. patent application Ser. No. 09/414,028, filed on Oct. 1, 1999, which claims priority and is based on U.S. Provisional Patent Application No. 60/102,880, filed Oct. 2, 1998.

FIELD OF THE INVENTION

The present invention relates to saws and other cutting and machining tools which have their cutting or machining surfaces coated with polycrystalline cubic boron nitride (PCBN) and/or which have PCBN tips (strips or inserts) mounted on their cutting or machining surfaces for the purpose of cutting and/or machining hard materials such as Hardiplank®. More specifically, the present invention relates to the use of PCBN in the cutting and machining operations of Hardiplank® and other hard building materials which are cement and/or mineral based.

BACKGROUND OF THE INVENTION

Many hard materials have been developed especially for use in the home building industry. Many of these materials are Portland cement based materials and include other additives such as ground sand, cellulose fibers and the like. One such product is Hardiplank® manufactured by the James Hardie & Coy Pty Limited. The product is used as a replacement for conventional sidings used in homes. Hardiplank® is a cement based plank comprising Portland cement, ground sand, cellulose fibers, additives and water. A typical Hardiplank® plank has a length of about 12 feet, a width anywhere in the range of about 6 to 12 inches, and a thickness in the range of about 5/16 to 3/8 inch.

One typical saw blade used to cut such material is a circular steel blade. The saw blade consists of radial teeth formed around the circumference of the saw blade. Carbide tips are bonded on the leading edges of the teeth. As the saw blade rotates during cutting, the carbide tips engage the material and cut through it. Current carbide tipped saw blades are unsuitable for cutting Hardiplank®. For example, in one test, a saw blade with carbide tips was able to make only about 30 cuts on Hardiplank® planks prior to failing. In other words, after 30 cuts, the carbide tips needed re-sharpening or replacement. A cut is typically a cut of about 6 inches through a 3/8 inch Hardiplank® plank.

It is expected that bonding polycrystalline diamond ("PCD") tips instead of carbide tips to a blade will increase the cuts achieved by the blade. It is also expected that when used to cut Hardiplank®, a circular saw blade with PCD tips will have an operational life that is 100 times as great as the operational life of a saw blade with carbide tips. The problem with using PCD tips, however, is that they require special machine tools for grinding the PCD tips to a desired shape. As such, the manufacturing costs of PCD tips and similarly for PCD coatings for use with cutting and machining tools for cutting cement based materials such as Hardiplank® may be excessive.

Therefore, tips and coatings are needed that would improve the operating lives of the cutting and machining tools used for cutting and machining hard cement and/or mineral based materials such as Hardiplank®, and that can be ground and sharpened using the machine tools used to grind the current carbide tips and coatings.

SUMMARY OF THE INVENTION

Cutting tools and machining tools are provided having PCBN tips bonded to their cutting or machining surfaces or having their cutting or machining surfaces coated with PCBN. More specifically, the present invention is directed to using PCBN, and preferably PCBN having a high volume content of CBN, for cutting or machining cement and/or mineral based hard building materials such as Hardiplank®.

DESCRIPTION OF THE DRAWING

The FIGURE discloses a partial side view of a circular saw blade having PCBN tips bonded to the leading edges of its teeth.

DETAILED DESCRIPTION OF THE INVENTION

Cutting tools and machining tools are provided having PCBN tips bonded to their cutting or machining surfaces, or having their cutting or machining surfaces coated with PCBN. More specifically, the present invention is directed to using PCBN, and preferably PCBN having a high volume content of CBN, for cutting or machining hard cement and/or mineral based building materials such as Hardiplank®. For illustrative purposes the present invention is described herein in relation to a circular saw blade for cutting Hardiplank®. However, the invention can be just as equally practiced on other cutting or machining tools which are used to cut or machine Hardiplank® or other cement and/or mineral based products. Some examples of other cutting and machining tools include bandsaws and routers. For convenience the term "cutting tool" is used herein to refer to cutting tools and machining tools. Morever, the term "cutting surface" when used in relation to a cutting tool refers to the tool's cutting surface or machining surface. Similarly, the term "cutting" as used herein in relation to a cutting tool refers to cutting or machining.

A circular steel saw blade 8 as shown in the FIGURE is typically used for cutting hard material such as Hardiplank®. To improve its operating life, PCBN tips (also referred to herein as strips or inserts) 12 are bonded to the leading edges 14 of the saw blade teeth 10. Preferably, the tips are brazed to the teeth leading edges. Preferably, on PCBN tip 12 is bonded to each leading edge 14. To make PCBN tips, typically a mixture of cubic boron nitride (CBN) crystals, titanium carbon nitride (TiCn) and $Co_2Al_9$ are treated at an elevated temperature in ammonia to reduce oxygen and carbon and increase nitrogen. The mixture is then subjected to high temperatures and pressures where CBN is thermodynamically stable for forming PCBN. The high pressure form of boron nitride is surpassed only by diamond in hardness and wear resistant properties. Typically PCBN is formed on a tungsten carbide substrate using this method. The PCBN with the substrate is then cut into strips (i.e., tips) typically by EDM. The strips are then brazed to the cutting tool. This is accomplished by brazing the substrate side of the strips to the cutting surfaces.

PCBN tips or coatings may be bonded to cutting tools having tungsten carbide bodies or blades which are used to cut cement and/or mineral based hard materials such as Hardiplank®. Bonding of PCBN to a tungsten carbide body or blade may occur by any of the well known bonding methods, as for example, sintering. PCBN tips may also be bonded to the cutting surfaces of any cutting tool used to cut cement and/or mineral based materials and is not limited to cutting tools made of steel or tungsten carbide.

Applicants brazed PCBN tips on the leading edges 14 of the teeth 10 of a blade 8 used to cut Hardiplank® and to their surprise discovered that the operational life of the blade was over 30 times as great as the operational life of a blade with carbide tips operating in the same environment. More than 1000 cuts were achieved prior to having to replace or resharpen the PCBN tips. The PCBN tips tested were made from applicant Sandvik's N90 grade PCBN which has a high volume content of CBN.

PCBN tips or coatings can be ground using conventional machine tools currently being used to grind and sharpen the carbide tips on saw blades. Thus, applicants discovered that by using the PCBN tips or coatings they are able to increase the operational lives of the blades used to cut the hard cement and/or mineral based materials without burdening the cutting operations, i.e., without requiring additional machine tools for their grinding. It is expected that improvements of similar magnitude will be experienced in the operating lives of other cutting tools that have their cutting surfaces coated with PCBN or that have tips mounted on their cutting surfaces which are used in cutting cement and/or mineral based materials such as Hardiplank®. The PCBN tips and coatings may be polished or lapped using the same equipment that is used to polish or lap carbide tips or coatings. A preferred PCBN tip or coating thickness is in the order of 0.030 inch.

A preferred grade of PCBN for making tips is Sandvik's N90 grade which consists of CBN, AlN, and WC, Co. The material has a high CBN volume percentage which is in the range of 90%–92%, and an average CBN grain size between 2–3 microns. The Vickers hardness is typically in the range of 2900–3200 kg/mm$^2$, while its density is between 4.0 and 4.4 g/cm$^3$. The N90 grade of PCBN is brazable and can be easily cut by EDM. Other grades PCBN may also be used. For example, another grade of PCBN that may be used is applicant Sandvik's N100 grade which consists of CBN, AlN and SiC. This grade of PCBN has a CBN volume percentage approximately 98% with an average CBN grain size of 18–22 microns. The Vickers hardness of this grade of PCBN is between 3000 and 3400 kg/mm$^2$ and its density is between 3.4 and 3.5 g/cm$^3$. N100 material is preferably cut by laser. Brazing may be more difficult but can be accomplished in a vacuum.

Yet another grade of PCBN that may be used is applicant Sandvik's N50 grade which consists of CBN, TiCN, AlN and WC, Co. This grade of PCBN has a CBN volume percentage between approximately 57%–60% with an average CBN grain size in the range of 2–3 microns. The Vickers hardness of this grade of PCBN is between 2700–3000 kg/mm$^2$ and its density is between about 4.3 and 4.5 g/cm$^3$. This N50 grade of PCBN has a relatively medium content of CBN. N50 is brazable and can be easily cut by EDM.

It is also expected that similar grades of PCBN made by other manufacturers will also yield similar results. These similar grades of PCBN include General Electric's BZN8100™, DeBeers' DBC50 and Sumitomo's BN250 which are similar to Sandvik's N50; General Electric's BZN6000™, DeBeers' DBC80, and Sumitomo's BN100 which are similar to Sandvik's N90; and General Electric's BZN7000™, and DeBeers' Amborite™ which are similar to Sandvik's N100.

What is claimed is:

1. A method for cutting a cement based material comprising:
   providing a cutting blade having a cutting surface covered with a PCBN surface;
   cutting the cement based material using the PCBN covered cutting surface; and
   grinding the PCBN surface after cutting using equipment used to grind carbide material.

2. The method as recited in claim 1 wherein the cement based material comprises Portland cement, ground sand, and cellulose fibers.

3. The method as recited in claim 2 wherein the cement based material is Hardiplank®.

4. The method as recited in claim 1 wherein the PCBN surface comprises cubic boron nitride, wherein the volume of the cubic boron nitride in the PCBN surface is in the range of about 90% to about 92%.

5. The method as recited in claim 1 wherein the PCBN surface comprises cubic boron nitride, wherein the volume content of the cubic boron nitride in the PCBN surface is greater than 90%.

6. The method as recited in claim 1 wherein the PCBN surface comprises cubic boron nitride, wherein the volume of the cubic boron nitride in the PCBN surface is in the range of about 57% to about 60%.

7. The method as recited in claim 1 wherein grinding comprises grinding without using electron discharge grinding equipment.

8. A method for cutting a cement based material comprising:
   providing a blade having a plurality of teeth, each tooth having a leading edge and a PCBN surface over the leading edge;
   cutting the cement based material using the PCBN surfaces of the teeth; and
   grinding the PCBN surface after cutting using equipment used to grind carbide material.

9. The method as recited in claim 8 wherein forming comprises bonding a PCBN tip to the leading edge of each tooth.

10. The method as recited in claim 8 wherein the cement based material comprises Portland cement, ground sand, and cellulose fibers.

11. The method as recited in claim 10 wherein the cement based material is Hardiplank®.

12. The method as recited in claim 8 wherein the PCBN surface comprises cubic boron nitride, wherein the volume of the cubic boron nitride in the PCBN surface is in the range of about 90% to about 92%.

13. The method as recited in claim 8 wherein the PCBN surface comprises cubic boron nitride, wherein the volume content of the cubic boron nitride in the PCBN surface is greater than 90%.

14. The method as recited in claim 8 wherein the PCBN surface comprises cubic boron nitride, wherein the volume of the cubic boron nitride in the PCBN surface is in the range of about 57% to about 60%.

15. The method as recited in claim 8 wherein grinding comprises grinding without using electron discharge grinding equipment.

16. A method for cutting a mineral based material comprising:
   providing a cutting blade having a cutting surface covered with a PCBN surface;

cutting the mineral based material using the PCBN covered cutting surface; and grinding the PCBN surface after cutting using equipment used to grind carbide material.

17. The method as recited in claim 16 wherein the PCBN surface comprises cubic boron nitride, wherein the volume content of the cubic boron nitride in the PCBN surface is greater than 90%.

18. The method as recited in claim 17 wherein PCBN surface comprises cubic boron nitride, wherein the volume of the cubic boron nitride in the PCBN surface is in the range of about 90% to about 92%.

19. The method as recited in claim 17 wherein the PCBN surface comprises cubic boron nitride, wherein the volume of the cubic boron nitride in the PCBN surface is in the range of about 57% to about 60%.

20. The method as recited in claim 14 wherein grinding comprises grinding without using electron discharge grinding equipment.

* * * * *

UNITED STATES PATENT AND TRADEMARK OFFICE
CERTIFICATE OF CORRECTION

| | |
|---|---|
| PATENT NO. | : 6,698,415 B2 |
| DATED | : March 2, 2004 |
| INVENTOR(S) | : Michael J. Garcia et al. |

It is certified that error appears in the above-identified patent and that said Letters Patent is hereby corrected as shown below:

<u>Title page,</u>
Item [56], References Cited, U.S. PATENT DOCUMENTS, change "Koanduri" to -- Komanduri --

<u>Colunm 5,</u>
Line 9, change "wherein PCBN" to -- wherein the PCBN --

<u>Colunm 6,</u>
Line 7, change "14" to -- 16 --

Signed and Sealed this

Fifteenth Day of March, 2005

JON W. DUDAS
*Director of the United States Patent and Trademark Office*